United States Patent Office 2,777,325
Patented Jan. 15, 1957

2,777,325

APPARATUS FOR INDICATING OR MEASURING THE FLOW OF LIQUID THROUGH A CONDUIT

Jacobus Groenhof and Johannes H. Bockmeulen, Delft, Netherlands, assignors to Shell Development Company, Emeryville, Calif., a corporation of Delaware Application February 13, 1953, Serial No. 336,858

3 Claims. (Cl. 73—204)

This invention relates to a device for indicating or measuring the flow of liquid through a conduit and pertains more particularly to a thermally-responsive flowmeter in which a temperature determination is obtained by means of a heated or cooled body positioned in a conduit and washed by the flowing medium therein.

It has already been proposed to use for the washed body a part of the conduit itself, said part having a high degree of heat conductivity, and said conduit being circular in cross-section. Another proposal was that the washed body be designed as a streamlined solid of revolution fitted axially in the conduit, which is circular in cross-section. According to both proposals, the washed body is so arranged symmetrically with respect to all the planes passing through the axis of the conduit. For practical purposes, these devices can give a sufficiently exact indication of the flow provided that the conduit is always kept filled, but they are unsatisfactory when the conduit is not completely filled, that is when a flow of liquid takes place only in the lower part of a horizontally arranged conduit, while the remaining part is filled with either a flowing or a stationary quantity of gas.

With regard to the body placed axially or centrally in the conduit, this will require no further explanation, for if the liquid surface in the conduit does not reach this body, the latter will not be affected at all by the liquid flow, whereas if the body is completely submerged, a further rise in the liquid level will not cause any further alteration in the state of the body. This will also be the case when using a heated conduit wherein the indication obtained of the quantity of liquid flowing through will differ considerably from the actual quantity in an only partially filled conduit.

The primary object of the present invention is to provide an apparatus for accurately indicating and/or measuring the flow of fluid in a conduit whether the conduit be filled or only partially filled.

According to the present invention, a body, to be washed by a fluid stream, is vertically positioned substantially diametrically in a horizontal section of conduit. The washed body is arranged in this manner so that the magnitude measured (for example, the temperature of the body with respect to the temperature of the flowing medium, or the energy required per unit of time to maintain a predetermined temperature of the body) is a measure of the quantity of liquid flowing through the conduit per unit of time and is practically independent of whether the conduit is wholly or only partially filled by flowing liquid.

Tests have shown that, with a substantially horizontal conduit of circular cross-section, accurate flow measurements may be obtained by employing a substantially cylindrical body, which extends from the top of a cross-section of the horizontal conduit to nearly the lowest point of this section and is heated interiorly. The difference between the surface temperature of the body and the temperature of the liquid may be used in the measurement of flow. This can be done by keeping the temperature difference constant and measuring the energy required therefor per unit of time, which energy can be supplied, for example, in the form of an electric current.

The quantity of heat transferred per unit of time, $W = \alpha . F . t$, in which equation $t$ indicates the difference in temperature, F the surface of the washed body, insofar as it is in contact with the liquid, and $\alpha$ the coefficient of heat transfer. The coefficient of heat transfer $\alpha$ is dependent on the properties of the flowing medium, the shape of the body and the flow rate V of the medium, and is proportional to $V^n$, in which $n$ can vary from 0.3 to 0.8, depending on the remaining factors. As an average, $n = 0.5$ can be taken, so that $$\alpha \sim \sqrt{V} \text{ or } \alpha \sim \sqrt{\frac{Q}{A}}$$

in which Q is the quantity of liquid flowing through the conduit per unit of time and A is the surface of the conduit section occupied by liquid. It follows from the above calculation that $$W \sim \sqrt{Q} \frac{F t}{\sqrt{A}}$$

so that with a constant $t$, the requirement that W should be independent of the liquid level means that $$\frac{F}{\sqrt{A}}$$

is constant.

$$\frac{F}{\sqrt{A}}$$

will have a specific value for the totally filled conduit and this value should not alter if the liquid level changes.

If a body of revolution is selected for use in connection with a circular conduit, then according to this theory such a body must become increasingly thicker towards its base. If there is, however, no need for accurate measurement at very low liquid levels, the body may be so constructed that it terminates at some distance from the bottom of the conduit, the surface of the bottom of the solid of revolution then forming a compensation at the place where the rotary surface is omitted. Moreover, it is assumed in the foregoing that the body possesses an infinitely great coefficient of heat conductivity and that no heat is discharged to the conduit wall. However, at the point where the body is attached in the conduit such a discharge of heat is unavoidable and this, in combination with the finite coefficient of heat conductivity of the body, means that the temperature of the body will drop towards the point of attachment, instead of having the same temperature throughout.

In order to raise again the transfer of heat to the flowing liquid at all points of the body to the value corresponding to the average temperature of the body, this body may be made thicker at the point of lower temperatures and thinner at the point of higher temperatures. Tests have now shown that owing to the said influences, to which others may perhaps be added (such as that of uneven distribution of the flow rate over the cross-section of the conduit), a cylindrical or prismatic body which extends downwards from the top of the conduit for a distaance of 0.8 to 0.9 of the conduit diameter into the conduit, which body is heated practically throughout its whole length and whose average temperature in respect of that of the liquid is kept constant throughout this length, has a heat emission which, in a conduit about 20% full or having sufficient liquid therein to contact the body, is independent of the level in the conduit and depends only on the quantity of liquid flowing through.

The quantity of heat discharged is in this case a non-linear function of the quantity of liquid flowing through, but as will be explained more fully below, can be regarded as linear over most of the measuring range, which circumstance can be used for the purposes of an integrating measuring method.

The invention will be understood from the following description taken with reference to the drawing wherein.

Figure 1:
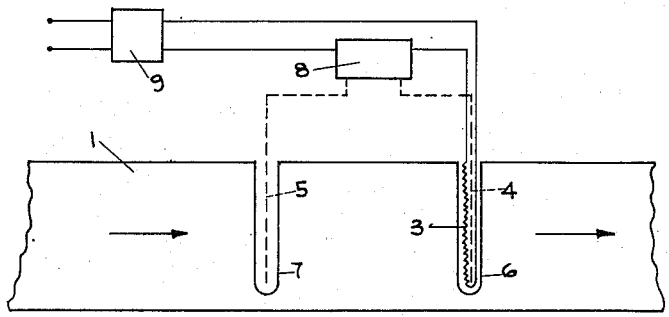
Figure 1 is a schematic diagram showing the component parts of the present invention.

In Figure 1 the conduit, in which liquid can flow in the direction of the arrow, is indicated by 1. Two cylindrical bodies 6 and 7 extend into the conduit from above and are provided with temperature-sensitive members 4 and 5, which measure the surface temperatures of these bodies, and which may be represented for example by temperature-sensitive electrical resistances or thermocouples. The body 6 is also provided with a heating element 3, in the proposed case an electric heating element. The current to this element 3 is controlled by means of the control member 8 in dependence on the difference in temperature between the temperature-measuring members 4 and 5, the second of which measures the temperature of the liquid and the first of which measures the temperature of the heated body 6. The control member 8 is so adjusted that the difference in temperature between the temperature-sensitive members 4 and 5 is kept constant, the energy supplied per unit of time to the heating element 3 being a measure of the quantity of liquid flowing through the conduit per unit of time. This energy can be measured or registered by means of the measuring device 9. The pair of bodies 6 and 7 and temperature-sensitive members 4 and 5 are employed to eliminate errors due to changes in temperature of the fluid within the conduit 1.

Figure 2:
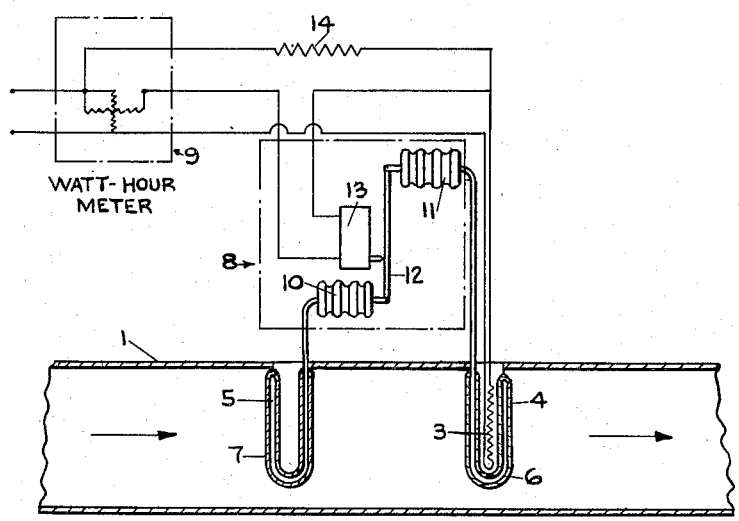
Figure 2 is a diagrammatic representation of one form of the present flowmeter.

Figure 2 illustrates in more detail the embodiment of the device according to the scheme shown in Figure 1. The members 4 and 5, which are sensitive to temperature, are formed in the construction by the hollow chambers of the double-walled cylindrical bodies 6 and 7, which chambers are filled with a liquid, with a gas, or with liquid and vapor, so that the pressure in these hollow chambers is, respectively, a measure of the temperature of the liquid flowing through the conduit and of the surface temperature of the body 6 which is heated by an electrical resistance 3 provided therein. The pressure in the hollow chamber 5 is transmitted to a bellows 10 while the pressure in the hollow chamber 4 is transmitted to a bellows 11. The expansion of these bellows 10 and 11 acts via a lever 12 in the opposite sense on a micro-switch 13 which controls the current to the heating element 3, such that the difference in temperature between 4 and 5 is kept substantially constant. The heating element 3 is not only fed by the current which is controlled by the switch 13, but also by a current, which is supplied to it over the series resistance 14. The reference numeral 9 indicates a watt-hour meter, the indication of which is proportional to the total quantity of liquid passed through the conduit 1, which is possible owing to the electric current supplied via resistance 14 to the heating element not influencing the meter 9.

Figure 3:
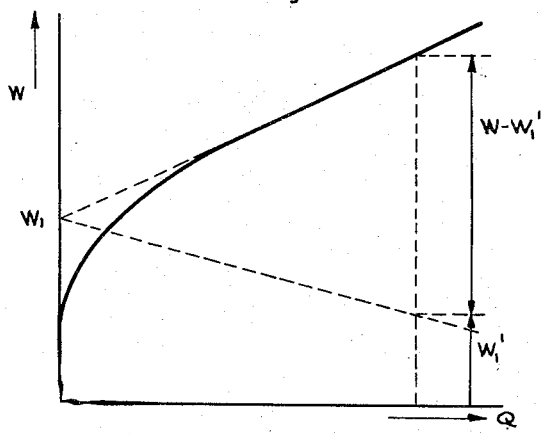
Figure 3 is a graph showing the relation between a quantity of flowing liquid and the heat emitted by the body of the liquid.

This will be illustrated with reference to Figure 3 which shows a graph in which the heat W emitted by the body 6 per unit of time is plotted as a function of the quantity of liquid Q flowing through per unit of time. This curve has a strongly pronounced curvature in the region where Q is small, but at greater Q values is almost straight and can be approximately replaced by the straight line indicated in the graph, which intersects the W axis at $W_1$. This value $W_1$ corresponds to the energy supplied over the resistance 14 to the heating element, when the switch 13 is open. The energy supplied over the resistance 14 will decrease to $W_1'$ for higher flow rates of liquid because the resistance 14 will be short-circuited by the watt-hour meter 9 and the switch 13 for an increasing part of the time, $W—W_1'$ corresponding to the energy measured by the watt-hour meter. Over the measuring range where curve and straight line practically coincide, even with varying Q and thus varying W, the indication of the watt-hour meter will be proportional to the total quantity which has passed through the conduit.

The various elements of the device according to the present invention may be constructed in many other ways than discussed above. Thus, various methods may be applied for heating or cooling the body 6, various methods for determining the surface temperature of the bodies 6 and 7, and numerous different parts for controlling and measuring, including electronic amplifiers, magnetic amplifiers or relays and the like.

The device according to the invention offers but little resistance to the liquid flow and is also suitable for liquid flows of fluctuating rate.

We claim as our invention:

1. Apparatus for measuring the flow of liquid through a substantially horizontal conduit, said apparatus comprising first and second elongated cylindrical temperature responsive fluid filled pressure bulbs vertically positioned within said conduit and extending through the top of said conduit and substantially across the bore thereof, said second pressure bulb being positioned downstream of said first pressure bulb and in spaced relationship thereto, electrical heating means positioned adjacent said second pressure bulb for heating said second pressure bulb, electrical circuit means including switch means for controlling the input of said heating means to maintain a constant temperature differential between said first and second pressure bulbs, pressure transmission means in communication between said first and second pressure bulbs and said switch means of said circuit means for actuating said switch means in response to changes in differential pressure between said bulbs, and means for continuously measuring the current supplied to said heating means, the input of said heating means being dependent on the flow through said conduit.

2. Apparatus for measuring the flow of liquid through a substantially horizontal conduit, said apparatus comprising first and second elongated cylindrical temperature responsive fluid filled pressure bulbs vertically positioned within said conduit and extending through the top of said conduit and substantially across the bore thereof, said second pressure bulb being positioned downstream of said first pressure bulb and in spaced relationship thereto, electrical heating means positioned adjacent said second pressure bulb for heating said second pressure bulb, electrical circuit means including switch means for controlling the output of said heating means to maintain a constant temperature differential between said first and second pressure bulbs, means for continuously measuring the current supplied to said heating means, said input of said heating means being dependent on the flow through said conduit, first and second flexible pressure-responsive means in pressure communication with said first and second pressure bulbs, and linkage means inter-connecting said flexible pressure-responsive means with the switch means of said electrical circuit means, said switch means being actuated by changes in the pressure differential between said pressure bulbs.

3. Apparatus for measuring the flow of liquid through a substantially horizontal conduit, said apparatus comprising first and second elongated cylindrical double-wall temperature responsive fluid filled pressure bulbs vertically positioned within said conduit and extending through the top of said conduit and substantially across the bore thereof, said second pressure bulb being positioned downstream of said first pressure bulb and in spaced relationship thereto, electrical heating means positioned adjacent said second pressure bulb for heating said second pressure bulb, electrical circuit means including switch means for controlling the input of said heating means to maintain a constant temperature differential between said first and second pressure bulbs, and means for continuously measuring the current supplied to said heating means, said input of said heating means being dependent on the flow through said conduit, first and second expansion bellows in pressure communication with the space between the walls of said pressure bulbs, and a bar member pivotally connected with each of said first and second bellows for oppositely directed motions and in contact with said switch means, whereby said switch means is actuated by said bar member in response to changes in the pressure differential between said bellows.

References Cited in the file of this patent

UNITED STATES PATENTS

| | | |
|---|---|---|
| 1,222,492 | Thomas | Apr. 10, 1917 |
| 1,245,688 | Crewson | Nov. 6, 1917 |
| 2,197,564 | Yaglou | Apr. 16, 1940 |
| 2,404,597 | McClain | July 23, 1946 |
| 2,650,496 | Middleton et al. | Sept. 1, 1953 |

FOREIGN PATENTS

| | | |
|---|---|---|
| 632,439 | France | Oct. 4, 1927 |
| 293,547 | Great Britain | July 12, 1928 |
| 633,802 | Germany | Aug. 8, 1936 |
| 452,694 | Italy | Oct. 28, 1949 |